Sept. 9, 1947.  D. F. FOLLAND ET AL  2,426,992
GLIDE PATH TRANSMITTER
Filed May 27, 1942
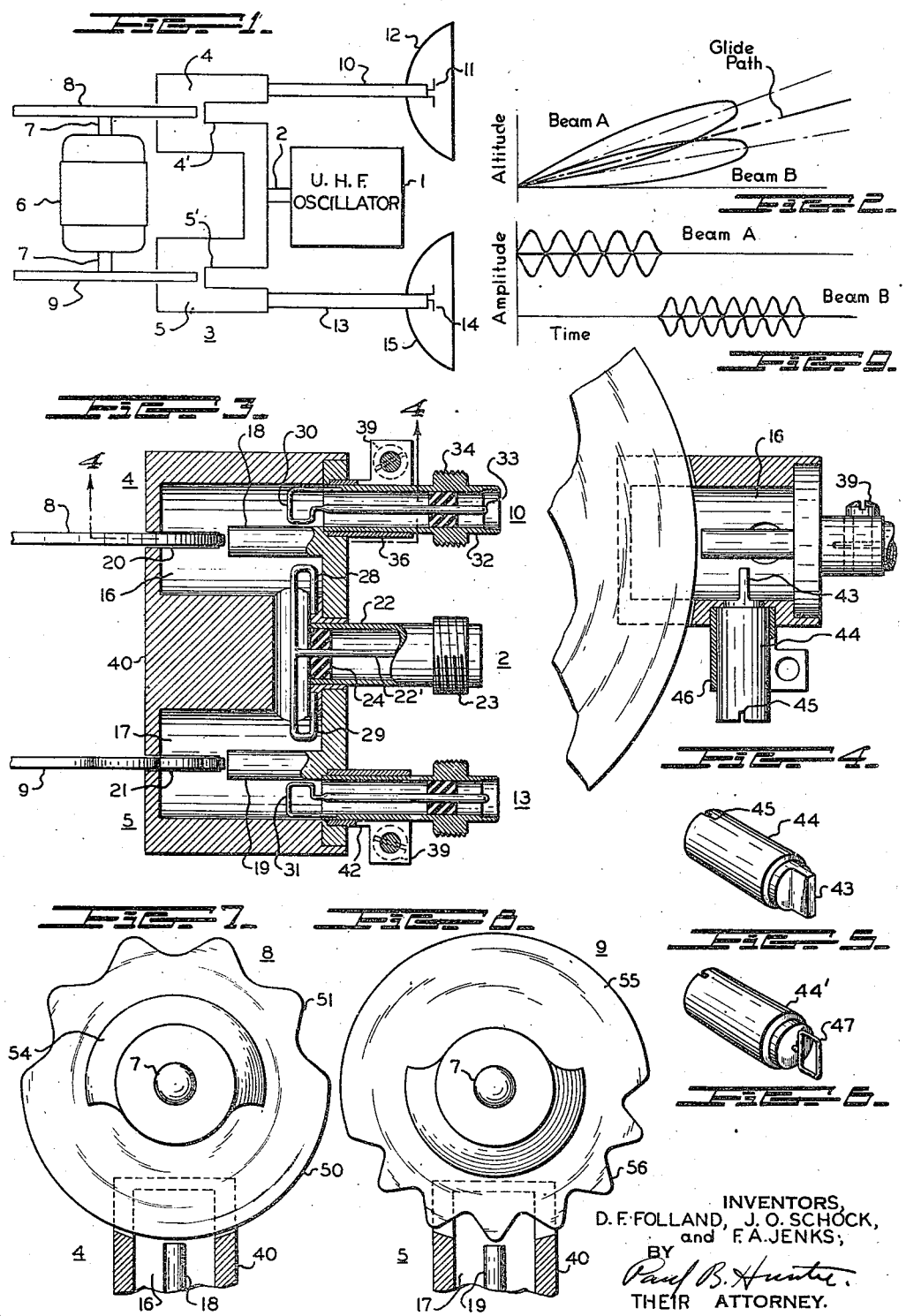
INVENTORS,
D. F. FOLLAND, J. O. SCHOCK,
and F. A. JENKS;
BY
THEIR ATTORNEY.

Patented Sept. 9, 1947

2,426,992

UNITED STATES PATENT OFFICE 2,426,992

GLIDE PATH TRANSMITTER

Donald F. Folland, East Hempstead, Joy O. Schock, Garden City, and Frederic A. Jenks, Rockville Centre, N. Y., assignors to Sperry Gyroscope Company, Inc., Brooklyn, N. Y., a corporation of New York Application May 27, 1942, Serial No. 444,668

23 Claims. (Cl. 250—11)

This invention relates generally to instrument landing systems for aircraft and it refers, more particularly, to systems employing a pair of overlapping radio beams to define a glide landing path. Earlier systems of the general type referred to herein include the arrangements described in U. S. patent application Serial No. 386,766, filed April 4, 1941, in the names of F. A. Jenks, D. F. Folland, A. S. Meader and W. T. Cooke, which application discloses an overlapping beam glide path system wherein the two path-defining beams of high frequency energy are modulated at different low frequencies and in which, in order to avoid interference patterns, only one beam is radiated at a time, alternate radiation of the two beams occurring in rapid sequence.

According to the disclosure of the prior application, modulation of the transmitted beams is accomplished by electronic means which require special power sources and other circuit accessories. The system of the present invention, among other advantages, constitutes an improvement over the disclosed arrangements in that simplified means are utilized to effect modulation and switching of the beams and in that by the use of the same means to perform both functions according to a repeated cycle exact synchronization of the operations is possible. In part these simplified means comprise mechanically operated devices for periodically altering the transmission characteristics of the paths over which high frequency energy is supplied to the beam radiators according to a predetermined pattern, these devices replacing certain of the electronic switching and modulating circuits of the earlier application.

In order to secure sharply directive beams with apparatus of moderate dimensions and for other reasons, instrument landing systems commonly make use of so-called micro-waves, that is, waves having a length of a few centimeters and correspondingly high frequencies of the order of hundreds or thousands of megacycles per second. At these extremely high frequencies, the propagation of waves in hollow conductors, including resonance within such conductors, becomes an important and highly useful phenomena and it is this principle which is the basis of the operation of the transmission controlling devices of the present invention.

Since arrangements other than those for defining a glide path make use of overlapping radiated beams as, for example, obstacle detection systems, it will be apparent that the improved circuit means disclosed herein are not limited in their application to landing systems. Neither are such means limited to the provision of only two overlapping beams. Systems employing a greater number of beams have been proposed and the means of the present application can readily and advantageously be incorporated in many of the circuits thereof.

One object of the invention is to provide a radio transmitter adapted to radiate in rapid sequence a plurality of overlapping directive beams.

Another object is to provide in such a transmitter means for distinctively modulating each of the several beams as it is radiated.

Another object is to provide an instrument landing glide path transmitter adapted to radiate, in alternation, a pair of beams modulated at distinctive frequencies and having overlapping directional characteristics.

Another object is the provision of mechanically operated means for tuning and detuning a cavity resonator according to a predetermined cycle to cause periodic modulation and switching of high frequency energy in repeated sequence.

A further object is to provide in a glide path transmitter a pair of tuning means of the above character operated in suitable phase relationship to cause alternate radiation of a pair of distinctively modulated beams.

Other objects and advantages of this invention will become apparent as the description proceeds.

Fig. 1 is a diagrammatic representation of a double beam transmitter according to the invention, including switching and modulating means.

Fig. 2 is a diagram illustrating a glide path.

Fig. 3 is a plan view, partly in section, of the switching and modulating unit of Fig. 1.

Fig. 4 is a partial section taken along the line 4—4 of Fig. 3.

Figs. 5 and 6 are details of tuning arrangements.

Figs. 7 and 8 are details of the switching and modulating unit of Fig. 2.

Fig. 9 is a diagram for purposes of explanation.

Referring now to Fig. 1, there is shown in diagrammatic form a glide path transmitter including means for generating, modulating and selectively radiating a pair of overlapping beams of high frequency electromagnetic energy. Reference numeral 1 is applied to an ultra high frequency oscillator, preferably frequency stabilized, which may, for example, be of the general type described in U. S. patent #2,242,275, issued May 20, 1941, to R. H. Varian. Oscillator or generator 1 is connected by a transmission path such as coaxial line 2 to switching and modulating unit 3 which comprises a coaxial conductor cavity resonator 4 having an axially positioned re-entrant portion 4' and a similar resonator 5 having a re-entrant portion 5'. A motor 6 rotates shaft 7 which mounts at opposite ends thereof a pair of discs 8 and 9 extending within resonators 4 and 5 respectively, through slots in the outer walls, with the peripheries of the discs in proximity to the re-entrant portions of the cavities. Discs 8 and 9 have irregularly formed peripheral contours which, upon rotation of the discs, cooperate with the re-entrant portions of the cavities to cause alternate tuning and detuning of the resonators with resultant modulation and switching of the radiated beams as will be hereinafter further described.

Resonator 4 is connected by coaxial line 10 to a radiating dipole 11 positioned at or near the focus of reflecting paraboloid 12. Similarly, resonator 5 is connected by transmission line 13 to dipole 14 at the focus of paraboloid 15. Reflecting paraboloids 12 and 15 are mounted to have their respective axes at a slight angle, one to the other, which causes the two radiated beams, A and B, to overlap as seen in Fig. 2. To define a suitable glide path the axis of the overlapping portion will be at a small angle to the horizonal as shown in the figure.

The construction of switching and modulating unit 3 and of the connections thereto may be seen in greater detail in Figs. 3 to 8. In Fig. 3, resonator 4 is seen to comprise a cavity 16 of generally cylindrical form within conducting housing 40 of the unit and to have a re-entrant portion bounded by the surface of centrally positioned cylindrical projection or conducting stud 18. Housing 40 is preferably constructed of a material having a low thermal coefficient of expansion in order to avoid distortion of the cavities therein due to temperature changes. In the boundary wall of cavity 16 opposite stud 18 a slot 20 permits rotatable disc 8 to extend within the cavity with clearance between the edge of the disc and stud 18 which may vary with the angular position of the disc.

Similarly resonator 5 is seen to comprise cylindrical cavity 17 having a reentrant portion bounded by the surface of centrally positioned cylindrical projection or conducting stud 19 and having a slot 21 in the oppositely positioned end wall which permits disc 9 to extend into the cavity within a small distance of stud 19. Variations of the clearance between discs 8 and 9 and studs 18 and 19, respectively, in a predetermined manner upon rotation of the discs is effected by the irregular contours of the discs.

Coaxial line 2, by means of which energy is supplied from oscillator 1 to resonators 4 and 5 of switching and modulating unit 3, may be of conventional construction comprising a tubular outer conductor or shield 22 in electrical connection with housing 40 and a central conductor 22' separated therefrom by annular insulators, such as 24. For convenience in connecting switching unit 3 to oscillator 1, line 2 may include a threaded joint 23 suitable to receive a similarly threaded separable connector. To provide electromagnetic coupling between line 2 and resonators 4 and 5, respectively, central conductor 22 branches to a pair of terminating loops 28 and 29, the respective outer ends of which are in electrical contact with housing 40.

To extract energy from resonator 4 for transmission to dipole 11, coaxial line 10 is terminated by a loop 30 extending between the central conductor 33 and the outer conductor or shield 32, which is in contact with housing 40. Also for convenience in making connections, outer conductor 32 may be threaded as at 34 to receive a separable connector. A support for line 10 at housing 40 is provided by split sleeve 36, mounted on the housing, in which tube 32 may be inserted and clamped by screw 39. This supporting means provides a rotatable adjustment of the orientation of loop 30 within resonator 4 to vary the energy taken from the resonator for transmission to dipole 11. Such adjustment will normally be employed to equalize transmission to the two radiating devices.

Similar arrangements are provided for adjustably coupling line 13 to resonator 5 comprising terminal loop 31 adapted to receive energy from resonator 5 for transmission over line 13 to dipole 14. The coupling adjustment in this case is provided by split sleeve 42 which permits variation of the angular position of loop 31.

Individual tuning adjustments may be provided for resonators 4 and 5 as shown more particularly in Figs. 4 to 6. As seen in Fig. 4, a fin-like projection 43, formed on a cylindrical bar 44 of either conducting or non-conducting material, extends within cavity 16. Bar 44 has a slotted head 45 adapted to receive a screw driver and is mounted in split sleeve 46, clamped by screw means (not shown), for adjusting purposes. The orientation of fin 43 whether of conducting or non-conducting material affects the density and distribution of the field within the cavity and may be utilized as a fine tuning means. In place of a solid member an alternative fine tuning arrangement may employ a short-circuited conducting loop as in Fig. 6, where loop 47 is shown mounted on an insulating support 44' corresponding to bar 44. Adjusting means similar to those illustrated may be provided for tuning resonator 5.

Figs. 7 and 8 illustrate certain forms which the contours of discs 8 and 9 may take and the relation of the discs to the re-entrant portions of resonators 4 and 5, respectively. In Fig. 7 disc 8 is seen mounted for rotation on shaft 7. This disc has a peripheral contour comprising a sector or portion of constant radius (about the center of rotation) 50 and an undulating sector or modulating portion 51, each extending over an arc of approximately 180 degrees. A counter-weight 54 may be provided to balance the reduced peripheral area of section 51. Disc 8 effectively constitutes an extension of stud or rod 18 which completes a path, including a variable air gap, to housing 40, thus terminating the resonator. From one viewpoint, therefore, the resonator may be looked upon as a section of a coaxial line. The variation of the air gap occurring when the undulating portion of the periphery passes stud 18 may be made use of to alternately tune and detune the resonator with respect to the frequency of oscillator 1.

By way of illustration, the modulating portion 51 of the disc is shown as comprising five undulations of substantially sinusoidal form. When the disc is positioned with the valley of one of these undulations opposite the end surface of stud 18, the natural frequency of resonator 4, by proper design, may be made approximately that of oscillator 1 and may be more exactly adjusted to correspondence with said frequency by a suitable orientation of fin 43. When resonator 4 is thus resonant to the frequency of oscillator 1 a maximum transfer of energy occurs from the oscillator to dipole 11. Rotation of disc 8 away from the described position to one in which there is less clearance between the edge of the disc and stud 18 results in detuning the resonator with a corresponding reduction in the energy received by dipole 11. While some leakage between loops 28 and 30 occurs when the crest of one of the undulations is opposite stud 18, this may be caused to be so small in comparison with the maximum transfer of energy at resonance that in practice it becomes negligible and therefore it may be considered that transmission of energy to dipole 11, and hence radiation of beam A is substantially shut off.

If the constant radius portion 50 of disc 8 has a radius equal to that at the crest of an undulation, dipole 11 will receive little or no energy for a period corresponding to a time interval extending over a plurality of modulations, e. g. a half revolution of the disc, and will receive energy periodically modulated in amplitude from a minimum to a maximum for the succeeding half revolution. The frequency of the modulation obviously will be determined by the circumferential spacing of the undulations, and the speed of rotation.

Disc 9, as can be seen in Fig. 8, is similar in form to disc 8, having a periphery comprising a portion of constant radius 55 and an undulating portion 56, each extending over approximately 180 degrees. The undulations or modulating members in portion 56 are more closely spaced than those of disc 8 to give a different and higher frequency of modulation. For example, disc 8 may provide modulation at 600 cycles per second (at a particular motor speed) while disc 9 may provide modulation at 900 cycles. Similar portions of coaxial discs 8 and 9 are angularly displaced 180 degrees apart so that the modulating portions are complementary to one another. Thus, when modulated transmission to dipole 11 occurs, disc 9 substantially prevents transmission to dipole 14, and conversely substantially no energy is received by dipole 11 when modulated energy reaches dipole 14.

In the operation of the transmitter of Fig. 1, therefore, beams A and B of Fig. 2, each modulated at a distinctive frequency are radiated in time sequence as shown in Fig. 9. Correct sequence of the modulating and switching periods is assured by the common means provided for accomplishing both functions, while synchronism between the on and off periods of the two beams is assured by the common support for discs 8 and 9 provided by shaft 7. Interference patterns which would otherwise result from the simultaneous radiation of two beams are thus entirely prevented. The rotation of the discs may be at a rate which causes the non-radiating periods to be so short that, to a pilot of an aircraft receiving the beams, both beams appear to be continuously radiated, for example, if motor 6 rotates at 3600 R. P. M., switching of each beam occurs 60 times a second.

The glide path is defined by the distinctive modulating frequencies of the two beams. In the region of reception of beam A a 600 cycle tone is received while in the region of beam B a 900 cycle note is received, assuming that these are particular modulating frequencies employed. On the correct glide path, the two modulating frequencies are of equal strength and blend to produce a combination tone.

While the modulating undulations of discs 8 and 9 have been illustrated and described as sinusoidal, it will be obvious that other patterns, shapes, and styles may be employed to effect special types of modulation when desired, such as square or flat tapped modulation, etc. Furthermore, the modulating and switching cycle need not be divided into the two equal parts that have been described. This will especially be the case when more than two beams are radiated or more than two loads of any character are supplied.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an instrument landing system, a high frequency energy source, a pair of directional radiators, individual transmission paths connecting said source and said radiators, a tunable hollow conductor wave guide interposed in each path, individual tuning means operable to produce periodic tuning and detuning of said wave guides with respect to the frequency of said source, the periodic tuning and detuning of said respective devices occurring during alternate halves of an iterated cycle and each device remaining in a constant condition during the remaining half of said cycle, and means for operating said tuning means.

2. In an energy distribution system, a source of ultra high frequency energy, a pair of radiators connected thereto by individual transmission paths, each path including a hollow conductor wave-guide portion, a pair of rotatable modulating devices provided about their periphery with means respectively cooperative with said wave guides during each rotation for producing in alternation, a periodic variation and a sustained suppression of the flow of energy from said source to each of said radiators, and means for synchronously operating said devices in suitable phase relationship to supply ultra high frequency energy alternately to each of said radiators.

3. In an instrument landing system, a source of high frequency energy, a pair of directional radiators positioned to radiate overlapping beams and connected to said source by individual transmission paths, each path including a hollow conductor wave-guide portion, a plurality of rotatable modulating devices having portions extending within and respectively cooperative with said wave guides for producing in alternation, a periodic variation and a prolonged substantial interruption of the flow of energy from said source to each of said radiators, and means for operating said devices in synchronism and in suitable phase relationship to supply ultra high frequency energy in sequence to each of said radiators.

4. In a radio transmitter, a source of high frequency energy, a plurality of radiators connected thereto by individual transmission paths, each path including a tunable concentric conductor resonator, individual conducting means associated with each resonator operable to tune and detune said resonator periodically with respect to the frequency of said source over a portion of an iterated cycle thereby to modulate the energy transmitted through said resonator, and over the remainder of said cycle to maintain said resonator in a constant condition, and means for operating said several conducting means in synchronism and in suitable phase relationship to cause modulated high frequency energy from said source to be supplied in sequence to said several radiators.

5. In combination, a source of high frequency energy, a load, a conducting path therebetween including a cavity resonator, means operable over a portion of a working cycle to cause said resonator to periodically approach and recede from a resonant condition and operable over another portion of said cycle to maintain said resonator in an unvarying condition, and means causing operation of said last means in accordance with said cycle.

6. A radio transmitter as claimed in claim 4 in which an initial tuning adjustment is provided for one of said resonators.

7. A modulating device for high frequency waves comprising a resonator including a hollow outer conductor, an internal rod laterally spaced therefrom and in contact therewith at one end only and a non-circular disc rotatably mounted with the periphery thereof adjacent the free end of said rod and another portion thereof adjacent said outer conductor and means for rotating said disc to vary the spacing between the periphery thereof and said rod.

8. In a radio circuit including a source of high frequency energy and a pair of load devices supplied therefrom, modulating and switching means comprising a pair of cavity resonators respectively connected in the transmission paths between said source and said loads, a pair of conducting members each having a center of rotation and a peripheral contour including a portion of uniform radius and a portion of non-uniform radius about said center, said members respectively extending into said cavities with the peripheries thereof adjacent conducting boundaries of the cavities and means for rotating said members in synchronism about said centers in suitable spaced relationship to cause similar portions of the respective discs to cooperate with said cavities at spaced intervals.

9. A high frequency modulating and switching device comprising a pair of cavity resonators each having a reentrant portion, means for supplying and extracting high frequency energy to and from said two resonators respectively, a pair of rotatably mounted conducting discs respectively extending within said resonators with the peripheries thereof in proximity to the reentrant portions of the cavities, said discs each having a peripheral contour including an arc of constant radius and a portion of sinusoidally undulating form, and means for synchronously rotating said discs with similar portions of the contours of the two discs in proximity to the reentrant portions of said cavities at different instants, said cavities having resonant characteristics such that minimum transmission therethrough occurs when the constant radius portion of a disc is in proximity to the reentrant portion of the associated cavity.

10. A high frequency switching and modulating device comprising a pair of concentric conductor resonators each having a hollow outer conductor and an elongated inner conductor laterally spaced therefrom and in electrical connection therewith at one end only, a pair of discs of generally circular form, each having a plurality of undulations formed in a portion of the periphery thereof, said undulations having different circumferential spacing in the two discs, means rotatably mounting each disc with the periphery thereof in proximity to the free end of an inner conductor of one of said resonators and another portion thereof in proximity to the corresponding outer conductor, means for supplying energy to and extracting energy from said resonators, and means for rotating said discs synchronously in predetermined phase relation.

11. A switching and modulating device as claimed in claim 10 wherein said means for supplying energy to and extracting energy from said resonator include adjustable coupling means.

12. A switching and modulating device as claimed in claim 10 wherein tuning means are provided for at least one of said resonators comprising a dielectric member and means for orienting said member relative to the field within said resonator.

13. A switching and modulating device as claimed in claim 10 wherein tuning means are provided for at least one of said resonators comprising a solid conducting member and means for orienting said member relative to the field within said resonator.

14. A switching and modulating device as claimed in claim 10 wherein tuning means are provided for at least one of said resonators comprising a conducting loop and means for orienting said loop relative to the field within said resonator.

15. In an instrument landing system, a source of high frequency energy, a pair of directional radiators, individual transmission paths connecting said source and said radiators, a cavity resonator interposed in each path, means including a displaceable conducting member cooperative with each resonator operable to tune and detune said resonator with respect to the frequency of said source in alternation over substantially half of an iterated cycle and to maintain said resonator in an untuned condition over the remaining half of said cycle, means for operating said conducting members in synchronism and in suitable relationship to cause the tuning cycles of the two resonators to differ in phase by 180°.

16. In a high-frequency energy-transmission system, a high-frequency energy source, a pair of output circuits, individual transmission paths connecting said source and said output circuits, a cavity resonator for said high-frequency energy in each of said paths, individual tuning means operable to produce periodic substantially sinusoidal tuning and detuning of said resonators with respect to the frequency of said source, and means for operating each of said tuning means to tune and detune one of said respective resonators during successive equal periods forming portions of an iterated cycle, and to cause said respective resonators to remain detuned during an interval corresponding to a plurality of periods for the remainder of said cycle.

17. A cavity resonator an input coupling device for transferring energy to said resonator from a source of stable oscillations, an output coupling device for transferring energy from said resontaor to a load circuit, and a rotatable tuning element projecting within the cavity of said resonator, said element having means cooperative with said resonator during a single rotation to provide periodic variation of said resonator frequency during a portion of each rotation, and to maintain the resonator frequency constant for a sustained time interval during the remainder of each rotation, whereby the amount of constant frequency energy conducted from said source to said load circuit varies with the resonator frequency.

18. A cavity resonator as claimed in claim 17 wherein said tuning element is provided with successively adjoining portions electrically reactive with said resonator to produce substantially sinusoidal variation of said frequency.

19. A cavity resonator as claimed in claim 17 wherein said tuning element comprises a discous member having an irregular surface cooperative with said resonator about not more than half of the periphery of said surface.

20. A cavity resonator comprising enclosing walls forming a resonant chamber, a conductive member extending part way across said chamber from one of said walls, a tuning element rotatably mounted relative to said chamber and having a peripheral portion located within said chamber between said member and the opposite wall of said chamber, said portion being provided about not more than half of said periphery with modulating means successively cooperative with said chamber to vary the natural frequency of said resonator.

21. A cavity resonator as claimed in claim 20 wherein said tuning element comprises a discous element having an undulating periphery extending edgewise toward the end of said member.

22. In combination, a source of constant frequency radio energy, a load, a conducting path therebetween including a cavity resonator, rotatable means cooperative with said resonator during a portion of an iterated cycle to recurrently vary the natural frequency of said resonator and thereby correspondingly to vary the coupling between said constant frequency source and said load, said rotatable means being cooperative with said resonator during the remainder of said cycle to maintain said resonator at a constant natural frequency.

23. An amplitude modulator of radio frequency oscillatons, comprising a cavity resonator having means for coupling a source of said oscillations with a load circuit, and a rotatable disc having peripheral irregularities cooperative with said resonator during each rotation to recurrently shift the natural frequency of said resonator from the frequency of said source, and accordingly to amplitude-modulate the energy to said load.

DONALD F. FOLLAND.
JOY O. SCHOCK.
FREDERIC A. JENKS.

REFERENCES CITED

The following references are of record in the file of this patent:

UNITED STATES PATENTS

| Number | Name | Date |
|---|---|---|
| 2,129,711 | Southworth | Sept. 13, 1938 |
| 2,287,621 | Kandoian | June 23, 1942 |
| 2,218,223 | Usselman et al. | Oct. 15, 1940 |
| 2,306,282 | Samuel | Dec. 22, 1942 |
| 2,244,756 | Alford | June 10, 1941 |

FOREIGN PATENTS

| Number | Country | Date |
|---|---|---|
| 802,756 | France | Sept. 15, 1936 |